(12) United States Patent
Schirrmann et al.

(10) Patent No.: US 12,479,594 B2
(45) Date of Patent: Nov. 25, 2025

(54) VEHICLE OPERATOR MONITORING METHOD AND SYSTEM

(71) Applicant: Airbus SAS, Blagnac (FR)

(72) Inventors: Arnd Schirrmann, Taufkirchen (DE); Oliver Klaproth, Taufkirchen (DE); Emmanuelle-Anna Dietz, Taufkirchen (DE); Catalina Obando, Blagnac (FR)

(73) Assignee: Airbus SAS, Blagnac (FR)

( * ) Notice: Subject to any disclaimer, the term of this patent is extended or adjusted under 35 U.S.C. 154(b) by 226 days.

(21) Appl. No.: 18/450,058

(22) Filed: Aug. 15, 2023

(65) Prior Publication Data
US 2024/0059425 A1    Feb. 22, 2024

(30) Foreign Application Priority Data
Aug. 17, 2022  (EP) .................................... 22315183

(51) Int. Cl.
*B64D 45/00* (2006.01)
*B64D 47/02* (2006.01)

(52) U.S. Cl.
CPC ............. *B64D 45/00* (2013.01); *B64D 47/02* (2013.01)

(58) Field of Classification Search
CPC ..................................................... B64D 45/00
See application file for complete search history.

(56) References Cited

U.S. PATENT DOCUMENTS

| | | | | |
|---|---|---|---|---|
| 7,468,673 B2 * | 12/2008 | Sultan | .................. | B60K 28/066 340/576 |
| 8,981,942 B2 * | 3/2015 | He | .......................... | G06Q 40/08 340/576 |
| 9,613,543 B2 * | 4/2017 | Whitlow | ............ | B64D 45/0015 |
| 9,919,712 B1 | 3/2018 | Doyen et al. | | |
| 10,328,946 B2 * | 6/2019 | Brooks | ............. | B60W 60/0059 |
| 10,426,393 B2 * | 10/2019 | Bosworth | .......... | B64D 45/0051 |
| 10,546,596 B2 * | 1/2020 | Clement | ................. | G08B 21/06 |
| 11,065,958 B2 * | 7/2021 | Mestha | ................ | G06V 10/147 |
| 11,341,352 B2 * | 5/2022 | Schwindt | ............... | A61B 5/746 |
| 11,360,472 B2 * | 6/2022 | Schwindt | ................. | G08G 5/34 |
| 11,518,408 B2 * | 12/2022 | Arechiga-Gonzalez | ..................... | B60W 40/08 |

(Continued)

FOREIGN PATENT DOCUMENTS

| | | |
|---|---|---|
| EP | 2434465 A2 | 3/2012 |
| EP | 3459857 A1 | 3/2019 |

OTHER PUBLICATIONS

European Search Report for corresponding European Patent Application No. 22315183 dated Feb. 6, 2023.

*Primary Examiner* — Michael A Berns
(74) *Attorney, Agent, or Firm* — Greer, Burns & Crain, Ltd.

(57) ABSTRACT

A computer-implemented method for monitoring an operator state of an operator of an aircraft. The operator performs an input operation on an input device that displays an interactive item, such as a button. Physical properties, such as location, start, ending, duration, force, pressure, etc., of the input operation are measured and compared with expected input performance data that was previously determined. Based on the result of the comparison, an operator state is determined. Based on the operator state, the operator monitoring system generates different control signals, that may alert the operator, engage an assistance system, or issue a distress call.

13 Claims, 3 Drawing Sheets

(56) References Cited

U.S. PATENT DOCUMENTS

| | | | |
|---|---|---|---|
| 11,661,195 B2 * | 5/2023 | Rangan | G08G 5/30 |
| | | | 701/3 |
| 11,857,324 B2 * | 1/2024 | Salmon-Legagneur | ..................... |
| | | | B64D 45/0056 |
| 11,928,970 B2 * | 3/2024 | Schwindt | G06Q 10/06311 |
| 11,993,267 B2 * | 5/2024 | Brooks | B60W 60/0051 |
| 2007/0296601 A1 | 12/2007 | Sultan et al. | |
| 2013/0323688 A1 | 12/2013 | Whitlow et al. | |
| 2015/0158495 A1 * | 6/2015 | Duncan | G08G 1/163 |
| | | | 701/1 |
| 2018/0186234 A1 | 7/2018 | Mestha et al. | |
| 2018/0186379 A1 | 7/2018 | Brooks et al. | |
| 2024/0059425 A1 * | 2/2024 | Schirrmann | B64D 45/0051 |

* cited by examiner

VEHICLE OPERATOR MONITORING METHOD AND SYSTEM

CROSS-REFERENCES TO RELATED APPLICATIONS

This application claims the benefit of European Patent Application Number 22315183.8 filed on Aug. 17, 2022, the entire disclosure of which is incorporated herein by way of reference.

FIELD OF THE INVENTION

The invention relates to vehicle operator monitoring, e.g. pilot monitoring in aircraft.

BACKGROUND OF THE INVENTION

Detection of operator states with respect to attention are typically divided in two categories detection-based on task and environment factors or based on operator factors.

Operator state assessment based on external factors relies on an assessment of the task and environment, such as the state of the vehicle and its surroundings such as traffic or weather. Factors such as high vehicle speed, malfunctions, busy traffic or challenging weather conditions are known to put high demands on operators. Detection of these situations can therefore be used to trigger support by automation. However, stressful situations can affect individual operators differently. The approximation of operators' attention based on contextual factors like the vehicle speed or traffic situation stresses is indirect and a more direct assessment of an operator state is desirable.

The second category includes subgroups which can be referred to as self-declaration and physiological measures.

Self-declarations of attention require operators to shift their attention away from the task of controlling the vehicle to request support, which may pose additional demand in stressful situations. This type of operator state detection is usually less favorable. In highly dynamic situations more unobtrusive methods are desired to approximate the availability of operator attentional resources with less distraction.

Physiological measures that allow to approximate operator attention often require additional sensors which can be expensive, uncomfortable to wear, or generally interfere with operation of the vehicle. In addition, most promising methods such as electroencephalography or eye tracking are very sensitive and often require controlled and stable measurement conditions for a reliable operator state assessment, which is difficult in real-life vehicle operations.

SUMMARY OF THE INVENTION

It is an object of the invention to improve vehicle operator monitoring, preferably in aircraft.

The object may be achieved by the subject-matter of one or more embodiments described herein. Additional embodiments are also described herein.

The invention provides a computer-implemented method for monitoring an operator state of an operator of a vehicle, preferably of an aircraft, the method comprising:
  a) receiving input performance data that are indicative of a physical property of an input operation performed by the operator on an input device;
  b) comparing the input performance data measured in step a) with expected input performance data and determining, based on the result of the comparison, an operator state;
  c) generating a control signal for the vehicle based on the operator state determined in step b).

Preferably, the input device comprises a touch input device that is configured for detecting a touch input operation of the operator on the touch input device.

Preferably, the input performance data include measured spatial data that are indicative of a location of the input operation. Preferably, the input performance data include measured temporal data that are indicative of a start of the input operation. Preferably, the input performance data include measured temporal data that are indicative of an ending of the input operation. Preferably, the input performance data include measured temporal data that are indicative of a duration of the input operation. Preferably, the input performance data include measured touch pressure data that are indicative of a touch pressure exerted by the operator on the input device.

Preferably, the expected input performance data include expected spatial data that are indicative of a location of an interactive item that can be interacted with by the operator through the input device. Preferably, in step b) the spatial data are compared with the expected spatial data.

Preferably, the expected input performance data include expected temporal data that are indicative of an expected start, expected ending, and/or expected duration of an interactive item being interacted with by the operator through the input device. Preferably, in step b) the temporal data are compared with the expected temporal data.

Preferably, the expected input performance data include expected touch data that are indicative of a force or pressure of a touch interaction with an interactive item by the operator through the input device. Preferably, in step b) the touch data are compared with the expected touch data.

Preferably, in step b) a imprecision value is determined that is indicative of a deviation between the input performance data and the expected input performance data. Preferably, the operator state is determined to be "impaired", when the imprecision value exceeds a predetermined first threshold. Preferably, the operator state is determined to be "incapacitated", when the imprecision value exceeds a predetermined second threshold.

Preferably, in step c), when the operator state is determined to be "impaired", the control signal is generated to cause a vehicle control system to inform the operator of a possible impairment and/or to engage a vehicle assistance system.

Preferably, in step c), when the operator state is determined to be "incapacitated", the control signal is generated to cause the vehicle control system to engage a vehicle assistance system and/or to alert another vehicle operator and/or to issue a distress call.

Preferably, step b) comprises receiving vehicle state data that are indicative of a current vehicle state, and the vehicle state data are combined with the input performance data or the imprecision value in determining the operator state.

Preferably, in step b) during determination of the operator state, input performance data of an input operation that is older is given a lower weight than input performance data of an input operation that is newer.

The invention provides an operator monitoring system for monitoring an operator state of an operator of a vehicle, preferably of an aircraft, the system comprising at least one input device for controlling the vehicle and means for carrying out a previously described method.

The invention provides a vehicle control system for controlling a vehicle, preferably an aircraft, the vehicle control system comprising a preferred operator monitoring system and means for controlling the vehicle based on a control signal generated by the operator monitoring system.

The invention provides an aircraft comprising a preferred vehicle control system.

The invention provides a computer program comprising instructions which, upon execution by a computer, cause the computer to carry out the steps of a preferred method.

The invention provides a computer-readable medium or a data carrier signal carrying the preferred computer program.

As typically safe operation of vehicles depends on coherent performance by human operators such as drivers or pilots, coherence of performance by skilled and able operators is moderated by the operator mental state, more precisely, by the attentional resources that are available for operating the vehicle.

Stressful situations, for example caused by traffic or vehicle malfunctions, can pose exceptional mental demands on operators. These demands can compete for attentional resources that could otherwise be dedicated to managing or controlling the vehicle, that may result in suboptimal vehicle operations. In such cases, advanced automation can support the operator to control the vehicle, for example by engaging autopilot, assistance systems or by calling human assistance.

Determining when the operator state reaches critical levels that may compromise the safety of vehicle operations and deciding when to engage automation to support the operator is challenging.

One idea used here includes behavioral or performance-based metrics to approximate operator mental state, since they often are directly related to the safety of vehicle operations. However, these measures in themselves rarely provide the required richness and depth of data to detect critical operator states in time. Most vehicles are operated by using physical buttons and controls with limited sensitivity and degrees of freedom, for example such as a car's gear stick or push buttons or levers in an aircraft cockpit.

Some interfaces like the steering wheel, gas and brake pedals or thrust levers require temporally and spatially precise inputs along at least one axis of movement (or two for an aircraft's yoke or sidestick) where imprecisions can be used to make inferences about the operator's mental state. However, modern automated vehicle control systems such as autopilots, advanced cruise control or lane centering render these controls obsolete in many situations.

One idea includes approximating an operator state using the accuracy of the operator input to input devices, such as touchscreens. With this approach many issues of known detection methods can be overcome. For example, the disclosed approach uses a direct measurement of operator performance instead of being solely based on external factors. Additional workload on the operator can be avoided. Furthermore, no additional sensor hardware, that might interfere with the operator, is needed. The discloses approach also allows for recording richer data compared to logging the states of conventional physical controls.

The disclosed technical solution may combine input devices for the vehicle operator able to measure the accuracy of input operations (e.g., touch displays) and a vehicle operator monitoring unit receiving situation data (environmental state, vehicle state) and the performance of the operator's inputs. The operator monitoring unit is able to compare the measured operator performance with expected performance for continuously determining the mental state of the operator. The result of the mental state monitoring can be provided to a higher-level vehicle control system for further decision making (alerting, mitigation actions, etc.).

Conventional input devices, such as pushbuttons, levers, dials and other physical controls in vehicles can be replaced by touch input devices (e.g., touchscreens) that are typically more sensitive to incoherent operator performance. Providing input to these devices requires precision by the operator along spatial (x- and y-axis) and temporal (start and ending of touch) dimensions. It should be noted that instead of replacing the conventional input devices they can also be equipped with additional touch input sensors.

Operator performance can be measured based on objective criteria for operator performance in vehicle operations. The objective criteria include, but are not limited to, positions of inputs on the touch input device as well as by predefined points in time when the start or ending of a touch input are expected. Imprecise performance can then be assessed as the deviation from button positions, delays in response time and too short or long periods of touch.

A determination of the operator mental state may be carried out as follows. Under nominal conditions, operators can dedicate the required amount of attention to give exact input to touch input devices for optimal vehicle control and to prevent faulty input. When challenging situations call for the operator's attention, the reduction in resources available is assumed to result in imprecisions of input to touch displays. Thresholds can be defined for critical deviations and delays of input, indicating critical levels of attention remaining for safe vehicle operations. When these thresholds are exceeded, higher levels of automation can be triggered to support operators and allow them to recover attentional resources.

The solution presented herein extends the existing vehicle control system by providing additional state information of operator mental state for decision making in the control loop. The vehicle control system is allowed to incorporate operator state information into operations, e.g., moving from semi- to full-automated operations in case of operator impairment, e.g., drowsiness or mental workload.

The measures disclosed provide an unobtrusive way to measure operator functional state during the operation of a vehicle. The proposed solution can be applied in real-time without imposing any additional cognitive or physical task load on the operator. This enables operator state assessment in settings that are highly dynamic and at the same time highly dependent on coherent operator performance.

It is also possible to enable automatic triggering of support, adaptation of operations, or modulation of the intensity of tasks without requiring human initiation. This is a useful functionality for semi-autonomous vehicle technologies that should be able to take control of the vehicle away from operators, for example when the operator becomes too fatigued or stressed to operate the vehicle.

The idea allows to assess operator mental state in real-time while they operate a vehicle. Hardware required includes at least one touchscreen to manage and control the vehicle as well as a computation device for computing approximations of the operators' mental state and activating automated support when required.

The following data may be assessed for estimating operator attention: When operators give input to the touchscreen, the precise coordinates in terms of two numerical parameters for the x- and y-axis positions of this input on the touchscreen may be recorded. In addition, for each touchscreen input given by the operator, the timing can be recorded in two additional parameters, of which the first may represent the exact start time of the input to the touchscreen while the second parameter may record the ending time of touch input.

The following data can be considered constant parameters to define performance for input to the touchscreen:

Objective performance standards are defined for inputs given to the touchscreen. The first part of this standard is preferably defined by the exact position of buttons on the touchscreen, for example as given by their center point in coordinates on the touchscreen x- and y-axes. The second part of the performance standard preferably describes the temporal dimension of inputs. These standards can be defined by the timing of specific events, such as new interactive items or information being displayed on the touchscreen or attention-grabbing stimuli such as visual or acoustic alerts. Finally, time intervals can be defined to specify short- and long-press inputs.

The following computations can be performed by the computation device to evaluate operators' performance:

For the spatial dimension of inputs, deviations along the horizontal and vertical axes can be computed by comparing operator input to the predefined standard. Timely performance can be assessed as reaction time, i.e., the time required by an operator to respond to a visual or acoustic stimulus such as an alert. Vigilant operators are likely to respond instantaneously to urgent messages, while e.g., fatigued or stressed operators may show a delayed reaction to alerts in terms of touchscreen input. Comparisons with actual operator inputs can uncover deviations from these intervals which are indicative of operator mental state. For example, fatigued operators may show significantly longer inputs for short- and long-presses, while stressed operators may give shorter touch inputs.

Operator state trends can be computed by considering not only the current input, but also deviations of previous inputs, for example by assigning a higher weighting factor to more recent inputs.

Recording imprecisions over the course of a vehicle operation allows for computation of trends such as decreasing levels of operator attention and to initiate supportive measures when required. However, more sophisticated evaluations of inputs can be thought of that build upon the described concept.

Objective standards for performance can be enriched by and adapted to contextual information from vehicle sensors. This allows for the evaluation of input accuracy given the specific situation (e.g., vehicle speed, flight phase, etc.).

Similarly, performance standards could be adapted to operator-specific factors like their current heart rate or individual ability to provide precise touch input, for example assessed under non-challenging baseline conditions.

Also, objective standards can be extended to describe sequences of actions, where performance can be evaluated on a more abstract level by not only evaluating where and when input was given, but also what commands were intended to be given in what order.

The invention may be applied in the cockpit of a vehicle, where the human operator uses the vehicle user interface located on a touchscreen, for example, to operate the vehicle. Use of the interface is, for example, reading information from and giving inputs to specific items on the touchscreen. A computational device can define what information and items will be displayed at what time onset and at what spatial locations defined by coordinates x and y, for example defined by their central point. Also, the computational device can define expected input for the interactive items, for example distinguishing between short- and long-presses by predefined touch durations. In addition, the computational device can record the input the operator gives with his hand, for example by pointing at and touching the display with their index finger. These inputs can be recorded in terms of their spatial coordinates, their temporal onset and duration.

Comparisons between touch inputs and interactive items can then be compared to evaluate the accuracy of inputs and approximate the amount of attention available to the operator when inputs were made. If these inaccuracies or imprecisions exceed a predefined criticality threshold, supportive measures can be triggered.

The vehicle control system is preferably connected to the operator-vehicle interface containing touchscreen and buttons. In addition to the interaction with the operator, the vehicle interface sends input performance information to the operator monitoring unit. The operator monitoring unit in addition may get vehicle state information from for assessing the performance input and the determination of operator mental state may be continuously sent to the vehicle control system. The vehicle control system may use the operator mental state information beside vehicle control operations for alerting the operator via the interface or triggering other measures.

BRIEF DESCRIPTION OF THE DRAWINGS

Embodiments of the invention are described in more detail with reference to the accompanying schematic drawings that are listed below

DETAILED DESCRIPTION OF THE PREFERRED EMBODIMENTS

Figure 1:
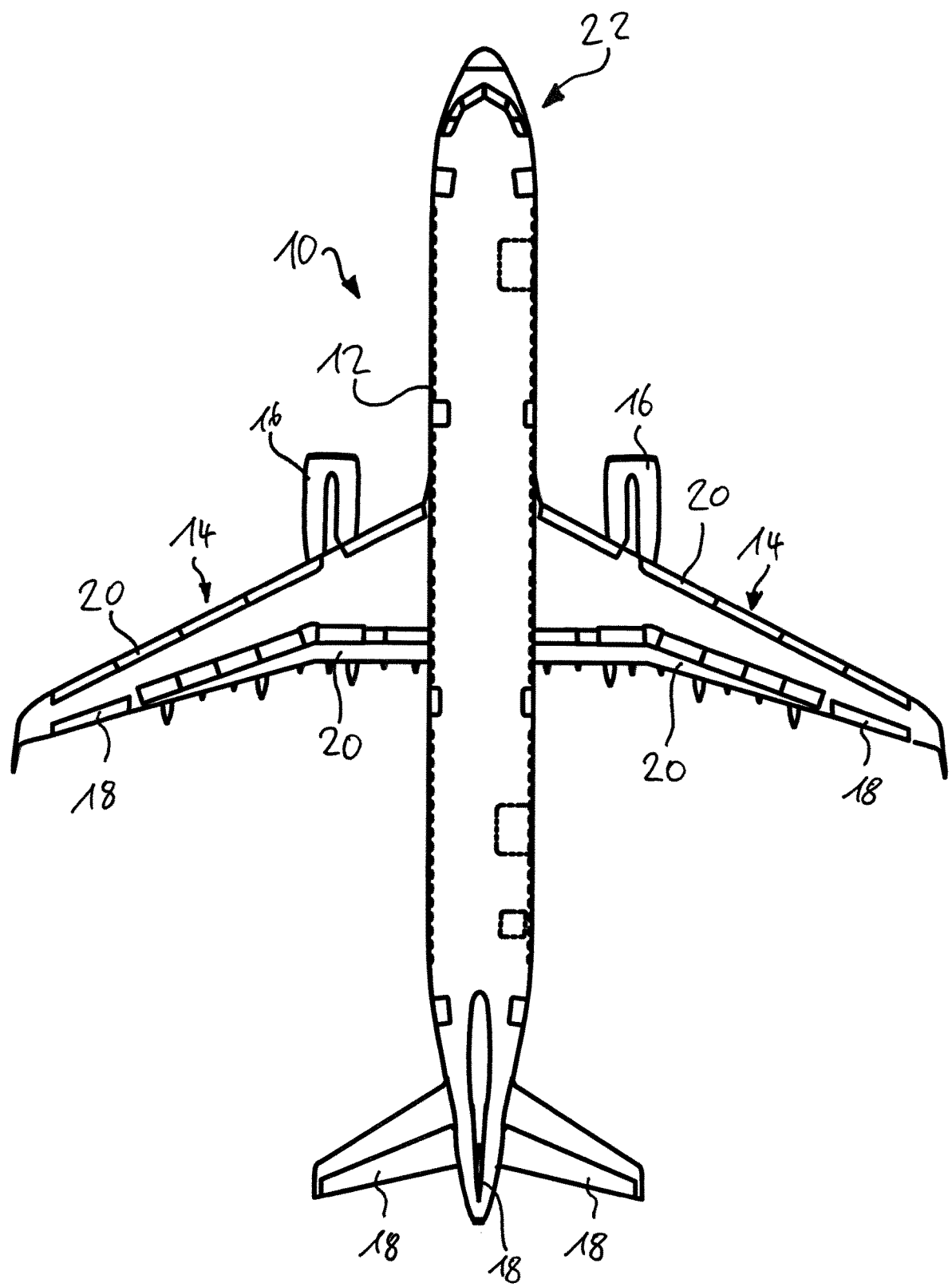
FIG. 1 depicts a vehicle according to the invention.

Referring to FIG. 1 an aircraft 10 that is an example for a vehicle is depicted. The aircraft 10 comprises a fuselage 12 to which a pair of wings 14 is attached. Each wing 14 comprises an engine 16 that propels the aircraft 10. The aircraft 10 also comprises a plurality of control surfaces 18 and some high-lift devices 20.

The aircraft 10 comprises a cockpit 22 that includes at least one operator 24 that is able to control the aircraft 10, e.g. the engines 16, the control surfaces 18, the high-lift devices 20, with a vehicle control system 26.

Figure 2:
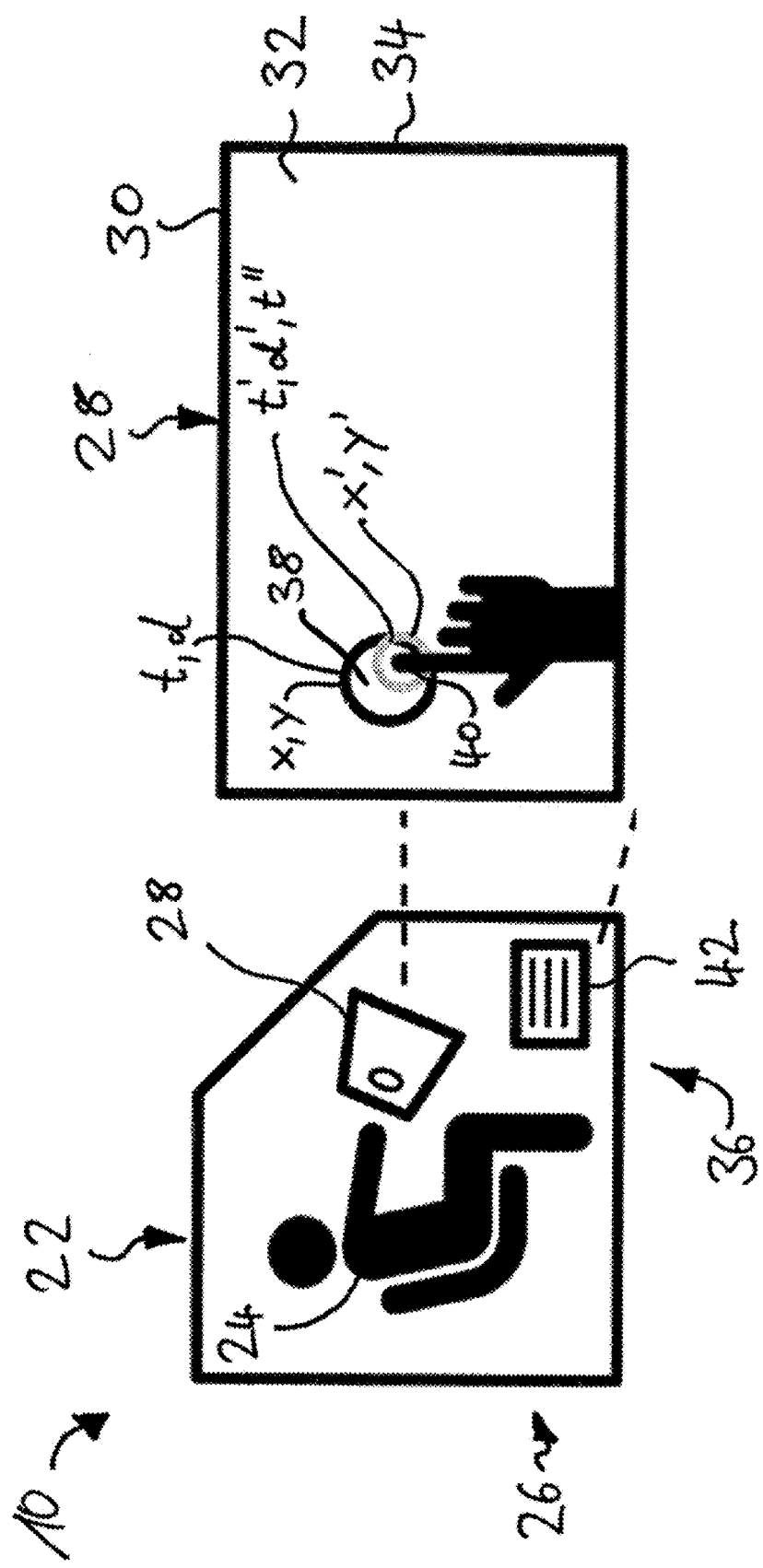
FIG. 2 depicts an embodiment of a vehicle control system.
Figure 3:
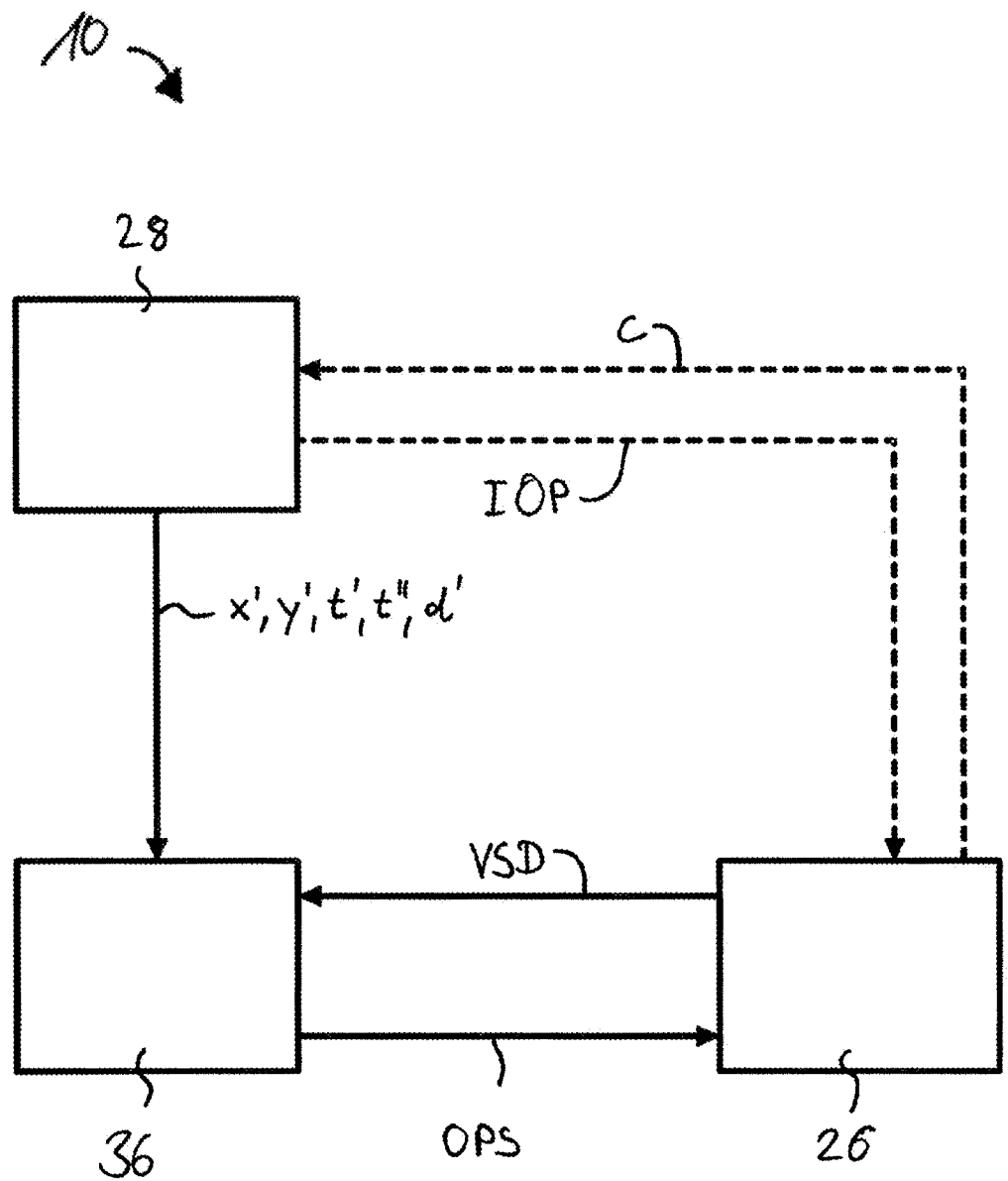
FIG. 3 depicts a data flow in the vehicle control system of FIG. 2.

Referring to FIG. 2 and FIG. 3, the vehicle control system 26 includes a plurality of input devices 28. The input device 28 may be configured as a touch input device 30 that may include a display 32. Collectively, such an arrangement is also called touchscreen 34.

The vehicle control system 26 includes an operator monitoring system 36. The operator monitoring system 36 is configured to determine an operator state OPS, e.g. whether the operator 24 is in "nominal condition", "impaired", or "incapacitated". This determination is performed as subsequently described.

Initially, the operator state OPS is preferably determined to be in "nominal condition" unit the operator monitoring system 36 determines otherwise.

Referring to FIG. 2, the input device 28 depicts an interactive item 38, e.g. a button, at a predetermined location. The location is typically defined by coordinates x and y on the display 32.

It is possible that the vehicle control system 26 sends a display control signal c to the input device 28. In response to the display control signal c, the input device 28 displays an interactive item 38. When the interactive item 38 is displayed, a point in time t of when the interactive item 38 starts to be displayed may be recorded. Furthermore, the interactive item 38 may have associated with it an expected duration d for which it should be interacted with. The physical properties, such as location, time, pressure, etc., that define the expectation of an input operation IOP is collectively designated as expected input performance data.

When the operator 24 performs an input operation IOP with the interactive item 38, e.g. by pressing, the input device 28 measures the actual location coordinates x' and y' and/or start t' of the input operation IOP. In other words, the input device 28 measures the coordinates of a finger 40 of the operator 24 touching the input device 28. It is also possible to measure an amount of force or pressure exerted by the operator 24 on the input device 28.

The input device 28 transfers the input operation IOP to the vehicle control system 26 and the input performance data to the operator monitoring system 36.

When the operator 24 ends their input operation IOP, e.g. by lifting their finger 40 from the interactive item 38, the input device 28 may also record the duration d' or optionally the ending t'' of the input operation IOP.

The measured spatial data, e.g. coordinates x' and y' and the measured temporal data, e.g. start t', duration d', and ending t'' are fed to an evaluation unit 42 of the operator monitoring system 36. The physical properties, such as location, time, pressure, etc., that are actually measured due to the operator 24 interacting with the interactive item 38 are collectively designated as measured input performance data.

In addition, the vehicle control system 26 may measure and feed vehicle state data VSD to the evaluation unit 42. Vehicle state data VSD are indicative of a current vehicle state; they may include, but are not limited to, vehicle speed, vehicle altitude, vehicle position, engine state, engaged/disengages assistance systems, and the like.

The evaluation unit 42 determines an imprecision value I that is indicative of a deviation of the operator's 24 performed input operation IOP from an expected standardized input operation IOP. The imprecision value may be calculated as an absolute deviation from the expected values according to $$I=|x-x'|+|y-y'|+|t-t'|+|d-d'|,$$

where d' is either directly measured or calculated from $d'=t''-t'$.

The vehicle state data VSD may be considered by defining a group of vehicle states depending on different pieces of vehicle data and associating each of these vehicle states with an impact value, that is indicative of an impact on the operator's 24 ability to safely operate the aircraft 10. The impact value for each vehicle state may be determined by experiment, e.g. in an according simulator. The impact value and the imprecision value may be combined in a suitable manner, e.g. by addition.

When the evaluation unit 42 determines that the imprecision value I or a combination of the imprecision value I and the impact value exceeds a first threshold, the evaluation unit 42 determines the operator 24 to be in an operator state OPS of "impaired".

If the evaluation unit 42 has determined that the operator 24 is impaired, the operator monitoring system 36 generates a control signal that causes the vehicle control system 26 to warn the operator 24 that they may be impaired in operating the aircraft 10. It is also possible for the control signal to engage additional assistance systems, such as autopilot, to control the vehicle.

When the evaluation unit 42 determines that the imprecision value I or a combination of the imprecision value I and the impact value exceed a second threshold, the evaluation unit 42 determines the operator 24 to be in an operator state OPS of "incapacitated".

If the evaluation unit 42 has determined that the operator 24 is impaired, the operator monitoring system 36 generates a control signal that causes the vehicle control system 26 to alert the operator 24 and other persons on the aircraft. It is also possible for the control signal to engage additional assistance systems, such as autopilot, to control the vehicle. Furthermore, it is possible for the control signal to automatically issue a distress call.

In order to improve vehicle operator monitoring in aircraft, the invention proposes a computer-implemented method for monitoring an operator state (OPS) of an operator (24) of an aircraft (10). The operator (24) performs an input operation (TOP) on an input device (28) that displays an interactive item (38), such as a button. Physical properties, such as location, start, ending, duration, force, pressure, etc., of the input operation (TOP) are measured and compared with expected input performance data that was previously determined. Based on the result of the comparison, an operator state (OPS) is determined. Based on the operator state (OPS), the operator monitoring system (36) generates different control signals, that may alert the operator (24), engage an assistance system, or issue a distress call.

The systems and devices described herein may include a controller or a computing device comprising a processing and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including modules, executed by one or more computers or other devices. Generally, modules include routines, programs, objects, components, data structures, etc., that perform particular tasks or implement particular abstract data types. Typically, the functionality of the modules may be combined or distributed as desired in various embodiments.

It will be appreciated that the systems and devices and components thereof may utilize communication through any of various network protocols such as TCP/IP, Ethernet, FTP, HTTP and the like, and/or through various wireless communication technologies such as GSM, CDMA, Wi-Fi, and WiMAX, is and the various computing devices described herein may be configured to communicate using any of these network protocols or technologies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft (vehicle)
12 fuselage
14 wings
16 engine
18 control surface
20 high-lift devices
22 cockpit
24 operator
26 vehicle control system
28 input device
30 touch input device
32 display
34 touchscreen
36 operator monitoring system
38 interactive item
40 finger
42 evaluation unit
IOP input operation
OPS operator state
VSD vehicle state data
c display control signal
x, y expected spatial data
t, d expected temporal data
x', y' measured spatial data
t', t'', d' measured temporal data

The invention claimed is:

1. A method for monitoring an operator state of an operator of a vehicle, preferably of an aircraft, the method comprising:
   a) receiving input performance data that are indicative of a physical property of an input operation performed by the operator of the vehicle on an input device, wherein the input device includes a touch input device configured to detect a touch input operation of the operator on the touch input device, wherein the input performance data includes measured spatial data indicative of a location of the input operation;
   b) comparing the input performance data measured in step a) with expected input performance data and determining, based on a result of the comparing, the operator state, wherein the expected input performance data includes expected spatial data indicative of a location of an interactive item that the operator interacts with through the input device, such that the measured spatial data is compared with the expected spatial data; and,
   c) generating a control signal for the vehicle based on the operator state determined in step b).

2. The method according to claim 1, wherein the input performance data further includes data selected from a group consisting of:
   measured temporal data that are indicative of a start of the input operation; or
   measured temporal data that are indicative of an ending of the input operation; or
   measured temporal data that are indicative of a duration of the input operation; or
   measured touch pressure data that are indicative of a touch pressure exerted by the operator on the input device; or
   any combination thereof.

3. The method according to claim 2, wherein the expected input performance data include expected temporal data that are indicative of an expected start, expected ending, expected duration, or any combination thereof of an interactive item being interacted with by the operator through the input device, and
   wherein in step b) the temporal data are compared with the expected temporal data.

4. The method according to claim 2, wherein the expected input performance data include expected touch data that are indicative of a force or pressure of a touch interaction with an interactive item by the operator through the input device, and
   wherein in step b) the touch pressure data are compared with the expected touch data.

5. The method according to claim 1, wherein in step b) a imprecision value is determined that is indicative of a deviation between the input performance data and the expected input performance data, and the operator state is determined to be "impaired", when the imprecision value exceeds a predetermined first threshold, or the operator state is determined to be "incapacitated", when the imprecision value exceeds a predetermined second threshold, or both.

6. The method according to claim 1, wherein in step c), when the operator state is determined to be "impaired", the control signal is generated to cause a vehicle control system to inform the operator of a possible impairment, or to engage a vehicle assistance system, or both; or wherein in step c), when the operator state is determined to be "incapacitated", the control signal is generated to cause the vehicle control system to engage a vehicle assistance system, or to alert another vehicle operator, or to issue a distress call, or any combination thereof, or both.

7. The method according to claim 1, wherein step b) further comprises receiving vehicle state data that are indicative of a current vehicle state, and the vehicle state data are combined with the input performance data or an imprecision value in determining the operator state.

8. The method according to claim 1, wherein in step b) during determination of the operator state, input performance data of an input operation that is older is given a lower weight than input performance data of an input operation that is newer.

9. The method according to claim 1, wherein the control signal generated includes a group selected from a group consisting of:
   engaging an autopilot; or
   generating a distress signal; or
   generating an alert signal to alert the operator; or
   any combination thereof.

10. An operator monitoring system for monitoring an operator state of an operator of a vehicle, the operator monitoring system comprising:
    at least one input device for controlling the vehicle, and
    a means for performing the method according to claim 1.

11. A vehicle control system for controlling a vehicle, the vehicle control system comprising:
    the operator monitoring system according to claim 10; and
    a means for controlling the vehicle based on a control signal generated by the operator monitoring system.

12. An aircraft comprising the vehicle control system according to claim 11.

13. A non-transitory computer-readable medium comprising:
    a computer program comprising instructions which, upon execution by a computer, cause the computer to carry out the steps of the method according to claim 1.

* * * * *